United States Patent [19]

Sun

[11] Patent Number: 4,746,273
[45] Date of Patent: May 24, 1988

[54] FAN BASE AND STAND CONSTRUCTION

[75] Inventor: Chieh Sun, Cresta Palos Verdes Estates, Calif.

[73] Assignee: Tatung Company of America, Inc., Long Beach, Calif.

[21] Appl. No.: 892,849

[22] Filed: Aug. 4, 1986

[51] Int. Cl.$^4$ ............................................. F01D 29/60
[52] U.S. Cl. .................. 416/244 R; 416/246; 248/221.4; 403/326
[58] Field of Search ............................ 416/246, 244 R; 248/221.4; 403/309, 326, 375, 364

[56] References Cited

U.S. PATENT DOCUMENTS

| | | | |
|---|---|---|---|
| 1,735,149 | 11/1929 | Werner | 416/246 |
| 2,096,319 | 10/1937 | Churchill | 248/221.4 |
| 2,099,655 | 11/1937 | MacFadden | 248/221.4 |
| 2,144,885 | 1/1939 | MacFadden | 248/221.4 |
| 2,154,767 | 4/1939 | Newnham | 416/100 |
| 3,405,894 | 10/1968 | Jordan et al. | 416/246 |

FOREIGN PATENT DOCUMENTS

| | | | |
|---|---|---|---|
| 582204 | 12/1924 | France | 416/246 |
| 795838 | 3/1936 | France | 416/246 |
| 1033034 | 7/1953 | France | 416/246 |
| 194422 | 3/1923 | United Kingdom | 416/246 |

*Primary Examiner*—Robert E. Garrett
*Assistant Examiner*—John T. Kwon
*Attorney, Agent, or Firm*—Gene W. Arant; Matthew F. Jodziewicz

[57] ABSTRACT

A fan assembly, adapted for easy disassembly for storage and transportation and for easy assembly, includes a housing having a protruding tab-like portion and which is adapted to house a motor and blade assembly. A vertical tapered supporting arm having a narrowed fork-shaped end and an opposite enlarged base end is attached to the housing by having the tangs of the fork-shaped end of the tapered supporting arm adapted to receive therebetween the protruding tab-like portion of the housing. The protruding tab-like portion of the housing and the tangs of the fork-shaped end of the tapered supporting arm, each has a passageway aligned to receive a threaded bolt therethrough. A nut is threadably mated with the bolt to retain the protruding tab-like portion of the housing and the fork-shaped end of the tapered supporting arm in a releasable, selectively positionable compressive relationship. A horizontal base plate member has a hole therethrough with the hole having a cross-section shape similar to that of the tapered supporting arm at a distance proximate the base end of the tapered supporting arm. The tapered supporting arm is adapted to be inserted through the hole in the base plate member and has a taper so that the supporting arm engages the sides of the base plate member forming the hole proximate the base end of the tapered supporting arm. The base end of the tapered supporting arm is releasably attached in a fixed three-dimensional relationship to the base plate member by screws.

3 Claims, 5 Drawing Sheets

FAN BASE AND STAND CONSTRUCTION

BACKGROUND OF THE INVENTION

1. Field of the Invention

This invention relates in general to portable electric fan construction, and, more particularly, to a fan assembly, adapted for easy disassembly for storage and transportation, and for easy assembly by the user.

2. Description of the Related Art

Prior to this invention, small portable and even larger floor model fans were generally transported and sold to the purchaser in a fully assembled state. Since fans as generally constructed comprise an electric motor, a fan blade or propeller, a blade or propeller guard, and a base and a support for supporting and mounting the motor, the final assembled item is both bulky and cumbersome for storage and transportation.

Heretofore, considerable difficulty has been encountered in providing a fan assembly that is both compact in disassembly and easy and quick to assemble for the user. Prior art fan assemblies have generally occupied a large volume of space, were costly to transport for the manufacturer and difficult to store for the purchaser. If the volume of space occupied by the fan assembly could be reduced for both storage and transportation purposes, a substantial savings would result for both the manufacturer in greater shipping densities and the purchaser in an easier to store device.

U.S. Pat. No. 2,154,767 to Newnham discloses a typical prior art attempt to solve the above noted deficiencies in the prior art by teaching a fan construction particularly of the oscillating type which is claimed to be simple and inexpensive to manufacture and assemble. Newnham, however, does not provide for a device that is easily or quickly disassembled and reassembled without the use of tooling and knowledge of electrical components not normally possessed by the average consumer.

SUMMARY OF THE INVENTION

The present invention provides an assembly that requires in one embodiment no tools to assemble or disassemble and in another embodiment only a screwdriver is required.

A broad object of the present invention is, therefore, to provide a fan assembly that is adapted for easy disassembly for storage and transportation, yet is easily and quickly assembled by the average consumer with a minimal amount of tools and no required special expertise on the part of the user.

It is another object of the invention to provide a fan assembly that is simple in construction, inexpensive to manufacture and operate, strong, durable and efficient in operation and service.

In an exemplary embodiment of the invention with a portable electric fan, the invention is directed to a fan assembly, adapted for easy disassembly for storage and transportation and for easy assembly, comprising a housing having a protruding tab-like portion and which is adapted to house a motor and blade assembly. A blade guard may also be mounted on the housing to protect a user from injury caused by the spinning blades. A vertical tapered supporting arm having a narrowed fork-shaped end and an opposite enlarged base end is attached to the housing as described below. The fork-shaped end of the tapered supporting arm has its tangs adapted to receive therebetween the protruding tab-like portion of the housing. The protruding tab-like portion of the housing and the tangs of the fork-shaped end of the tapered supporting arm, each has a passageway aligned to receive a threaded bolt therethrough. A nut is threadably mated with the bolt to retain the protruding tab-like portion of the housing and the fork-shaped end of the tapered supporting arm in a releasable, selectively positionable compressive relationship. A horizontal base plate member has a hole therethrough with hole having a cross-section shape similar to that of the tapered supporting arm at a distance proximate the base end of the tapered supporting arm. The tapered supporting arm is adapted to be inserted through the hole in the base plate member and has a taper so that the supporting arm engages the sides of the base plate member forming the hole proximate the base end of the tapered supporting arm. Means for releasably attaching, in a fixed three-dimensional relationship, the base end of the tapered supporting arm to the base plate member is provided.

In one preferred embodiment described below, the means for releasably attaching the base end of the supporting arm to the base plate member comprises having a plurality of downwardly extending tabs, integrally formed on the base end of the tapered supporting arm which are adapted to be received in a snap fitting relationship with the base plate member.

Yet, another preferred embodiment for the same means, also described below, comprises having a plurality of downwardly extending tabs integrally formed on the base end of the tapered supporting arm each of which has a passageway therethrough aligned with corresponding threaded recesses formed in the base plate member to receive a threaded screw therethrough to threadably connect the tapered supporting arm to the base plate member.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
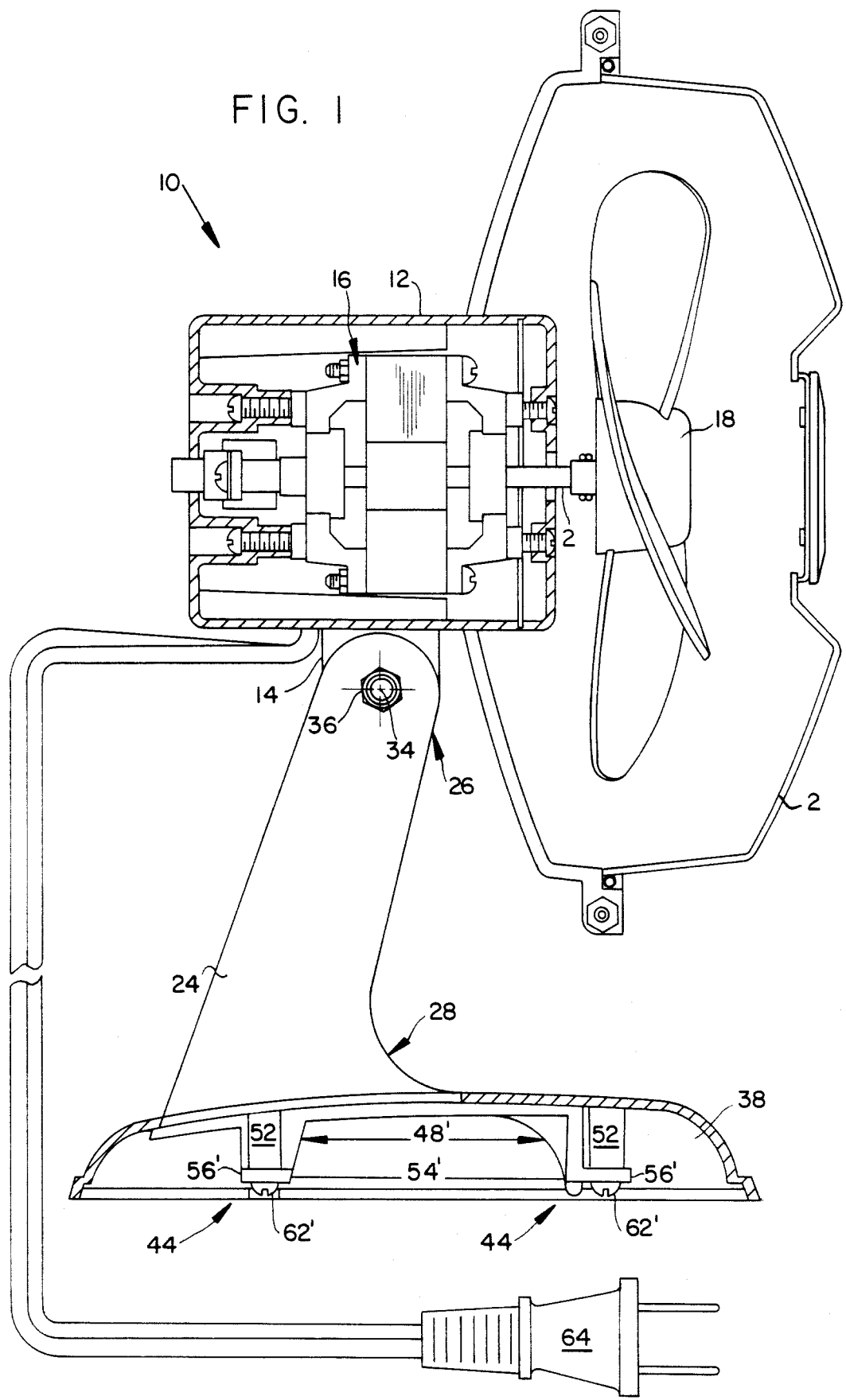
FIG. 1 is a cross-section side view of a portable electric fan assembly constructed in accordance with the invention herein.

Referring to the figures of the drawings, wherein like numbers of reference designate like elements throughout, it will be noted that in a preferred embodiment of the invention for use in a fan assembly, adapted for easy disassembly for storage and transportation and for easy assembly, the invention, generally referred to by the reference arrow 10, comprises a housing 12 having a protruding tab-like portion 14. Housing 12 is adapted to house an electric motor 16. A fan blade assembly 18 is mounted on the shaft 20. A fan blade guard 22 is mounted on housing 12 by any of the standard means, not illustrated, to protect a user from the moving fan blades and possible injury.

A vertical tapered supporting arm 24 has a narrowed fork-shaped end 26 and an opposite enlarged base end 28. The fork-shaped end 26 has tangs 30 adapted to receive therebetween the protruding tab-like portion 14 of housing 12.

The protruding tab-like portion 14 of housing 12 and tangs 30 of the fork-shaped end 26 of the tapered supporting arm 24, each have a passageway 32 aligned to receive a threaded bolt 34 therethrough. A nut 36 is threadably mated with the bolt 34 to retain the protruding tab-like portion 14 of the housing 12 and the fork-shaped end 26 of the tapered supporting arm 24 in a releasable, selectively positionable compressive relationship.

While the above description and drawings emphasize a fixed relationship between the narrowed end 26 of tapered supporting arm 24 and housing 12, it should also be understood that any commonly available oscillatory or rotatable mounting assembly means connecting these two members may also be employed in the invention without departing from the spirit and scope of the invention as claimed and taught herein.

A horizontal base plate member 38 has a hole 40 therethrough. Hole 40 has a cross-section shape similar to that of the tapered supporting arm 24 at a distance proximate the base end 28 of the tapered supporting arm 24. Tapered supporting arm 24 is adapted to be inserted through the hole 40 in the base plate member 38 and has a tapered shape from the narrowed fork-shaped end 26 to its opposite enlarged base end 28 so that the supporting arm 24 engages the sides 42 of the base plate member 38 forming the hole 40 proximate the enlarged base end 28 of the tapered supporting arm 24.

Means 44 for releasably attaching in a fixed three-dimensional relationship the enlarged base end 28 of the tapered supporting arm 24 to the base plate member 38 is illustrated in the drawings in two alternate preferred embodiments.

Figure 2:
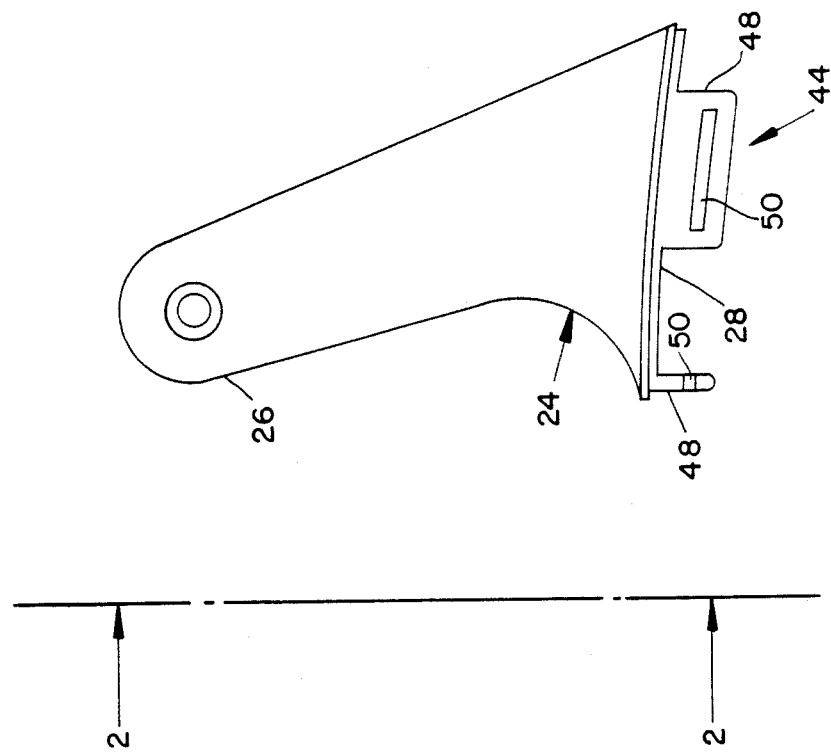
FIG. 2 is a side view of a tapered supporting arm of the fan assembly for snap-fitting attachment to the base plate member of the fan assembly.
Figure 3:
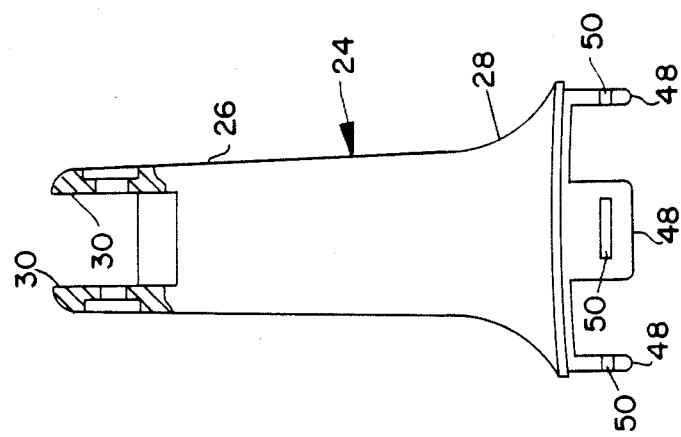
FIG. 3 is a front view taken along the line 2—2 of FIG. 2.
Figure 4:
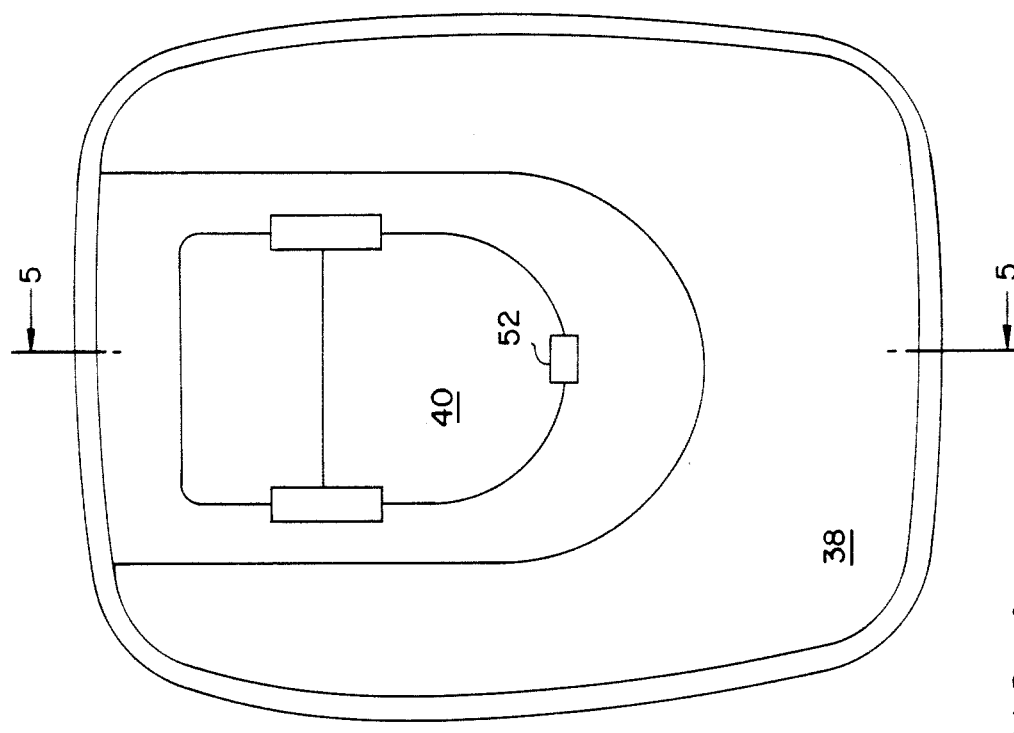
FIG. 4 is a bottom plan view of a base plate member adapted to mate with the tapered supporting arm of FIGS. 2 and 3 in a snap-fitting relationship.
Figure 5:
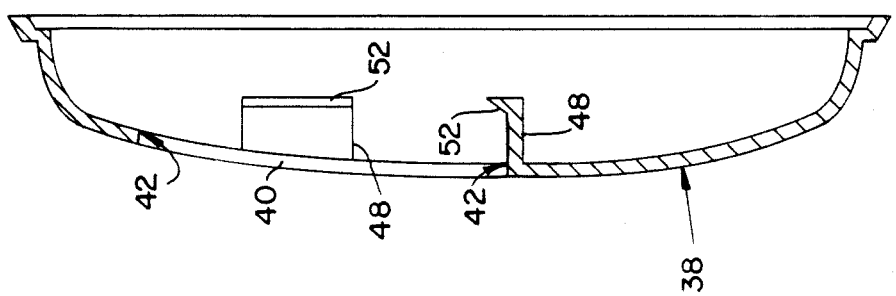
FIG. 5 is a view taken along the line 4—4 of FIG. 4.

In one embodiment, illustrated best in FIGS. 2 through 5, means 44 for releasably attaching the enlarged base end 28 of the tapered supporting arm 24 to the base plate member 38 comprises a plurality of downwardly extending tabs 48, integrally formed on the base end 28 of the tapered supporting arm 24. Three tabs 48 are illustrated in FIGS. 2 and 3 and are adapted to be received in a snap fitting relationship with the base plate member 38. Specifically, slots 50 are formed in tabs 48 and are adapted to receive therein in a snap-fitting relation protrusions 52 formed on sides 42 of the base plate member 38 forming the hole 40. Thus, tapered supporting arm 24 is quickly and easily attached and removed from its connection with base plate member 38 by an individual using no tools.

Figure 6:
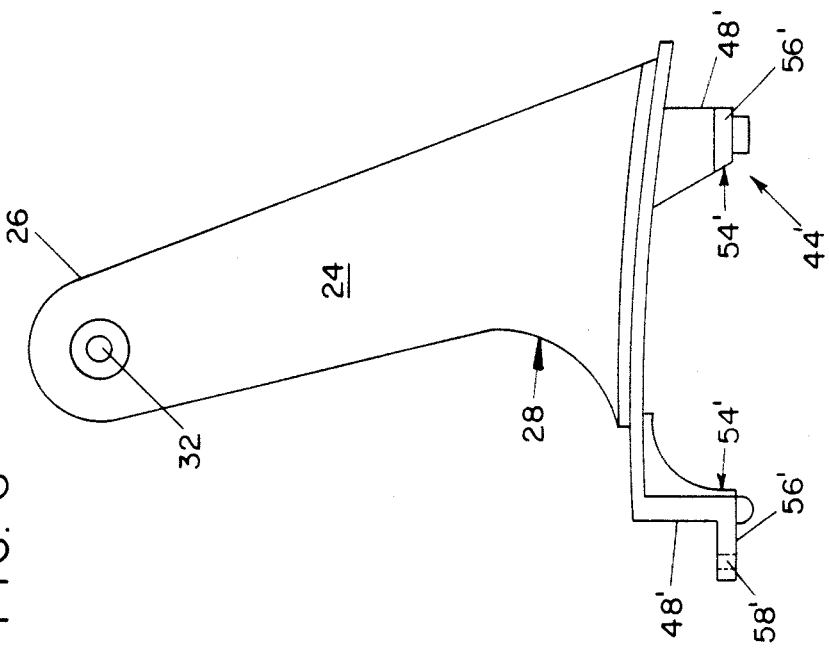
FIG. 6 is a side view of a tapered supporting arm of the fan assembly for screw attachment to the base plate member of the fan assembly.
Figure 7:
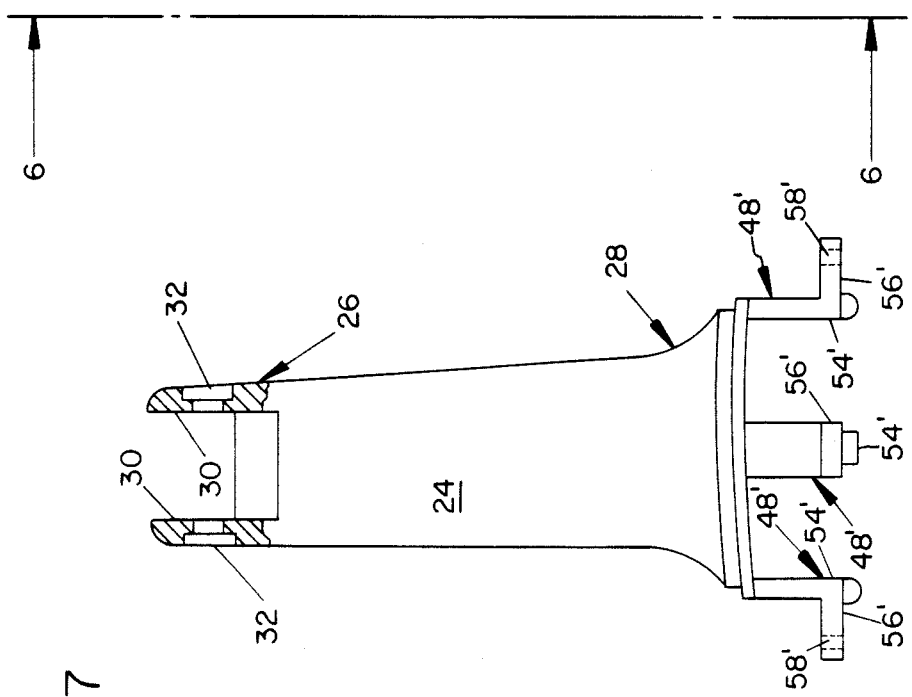
FIG. 7 is a front view taken along the line 6—6 of FIG. 6.
Figure 8:
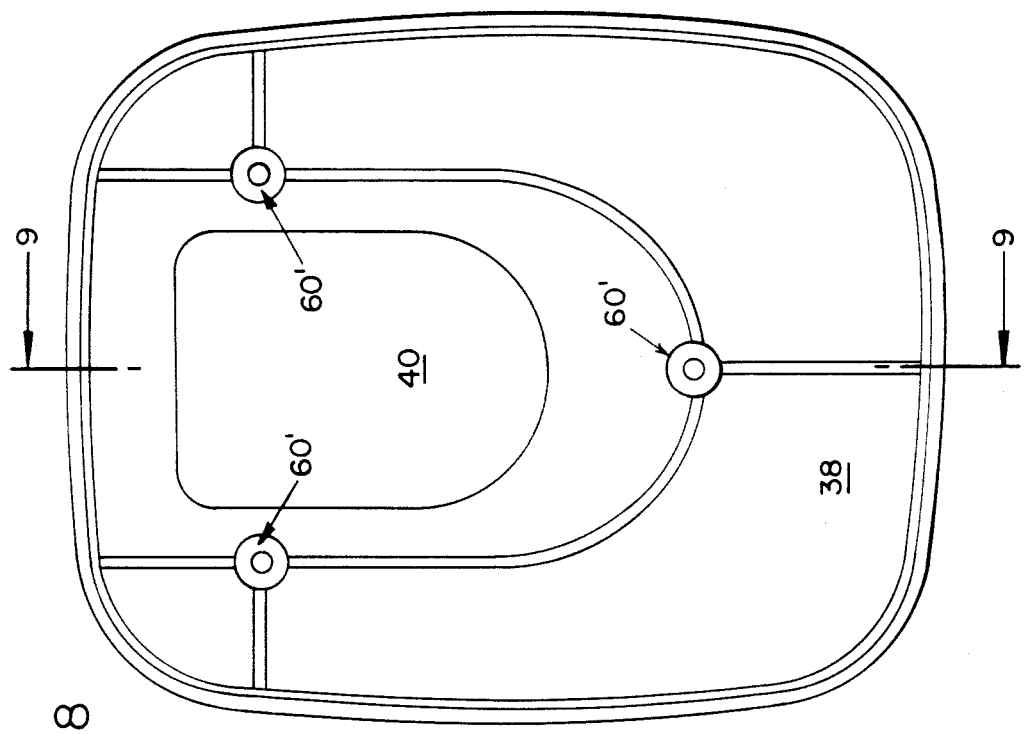
FIG. 8 is a bottom plan view of a base plate member adapted to mate with the tapered supporting arm of FIGS. 6 and 7 in a threadable relationship.
Figure 9:
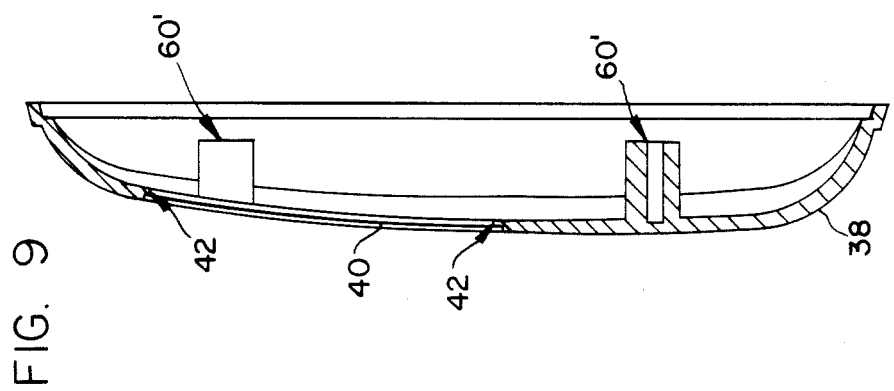
FIG. 9 is a view taken along the line 8—8 of FIG. 8.

In another embodiment, illustrated best in FIGS. 6 through 8, means 44' for releasably attaching the enlarged base end 28 of the tapered supporting arm 24 to the base plate member 38 comprises a plurality of downwardly extending tabs 48', integrally formed on the base end 28' of the tapered supporting arm 24'. Three tabs 48' are illustrated in FIGS. 6 and 7 and have on their ends 54' an angled section 56' with a passageway 58' therethrough. A corresponding threaded recess 60' is formed in base plate member 38 so as to align with passageways 58' to receive a threaded screw 62' as illustrated in FIG. 1 therethrough to threadably connect tapered supporting arm 24 to base plate member 38.

With this second described embodiment, an individual needs only a commonly available screwdriver to assemble or disassemble the tapered supporting arm 24 and base plate member 38.

Tapered supporting arm 24 can be hollow so as to increase the stability of the final assembly. The interior hollow area of tapered supporting arm 24 can be adapted to receive an electric power cord 64 therethrough or the electric power cord 64 can be simply routed outside the fan assembly as illustrated in FIG. 1.

The base plate member 38 can also be weighted to provide an increased stable support for the housing 12 and motor and blade assembly being housed therein. Also by weighting base plate member 38, greater curvature can be given to tapered supporting arm 24, thereby allowing it to extend upwardly and outwardly from base plate member 38 near the forward end thereof in a greater variety of aesthetically pleasing designs that would be otherwise precluded by the use of an unweighted base plate member 38.

In operation, the above described preferred embodiments of a fan assembly embodying the invention is assembled as follows. First, the disassembled members are easily distinguishable as being: the housing with the motor and blade assembly; the tapered supporting arm; and, the base plate member. The user first inserts the narrow end 26 of the tapered supporting arm 24 through hole 40 in base plate member 38 until the tapered sides of arm 24 abut the sides 42 of hole 40, forming a smooth surface. Then, depending on the specific embodiment chosen, the base end 28 of arm 24 is attached to base plate member 38 by either snap-fitting downwardly extending tabs 48, or screwing downwardly extending tabs 48' into corresponding mating sections of base plate member 38. Once arm 24 is attached to base plate member 38, the narrowed fork-shaped end 26 of arm 24 is attached to the protruding tab-like portion 14 of housing 12 by inserting a bolt 34 through passageways 32 formed in both end 26 and portion 14. A nut 36 is threadably mated with bolt 34 and tightened to provide a fixed compressive relationship between the housing 12 and supporting arm 24.

Disassembly of the fully assembled fan assembly would proceed by reversing the assembly steps described above.

Based on the above description of a preferred embodiment of the invention, it will be readily seen that the fan assembly described is adapted for easy disassembly for storage and transportation and is easily assembled by an individual both quickly and will little to no tooling. Thus, the invention meets and solves the above noted deficiencies in the prior art and provides a fan assembly that will benefit both the manufacturer and user.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

I claim:

1. In an electric fan assembly which includes an electric motor, a motor housing, a fan driven by the motor, a support arm for attachment to and support of the motor housing, and a base member for attachment to and support of the support arm, the improvement comprising:

said support arm being of elongated hollow configuration with a large base-engaging end and a smaller forked end for attachment to the motor housing;

said base member being of a generally upside-down dish-shaped configuration with a generally flat central wall which has a large central opening therein;

said support arm being adapted to be inserted through said central opening of said base member so that the external circumferential surface of said support arm proximate its large end then laterally engages the circumferential wall of said base member opening for laterally supporting said arm;

said support arm also having separate, circumferentially spaced fastening means at its large end which then extend into the interior of said base member; and said base member within its interior having separate, circumferentially spaced fastening means which cooperate with said fastening means of said arm for supporting said arm both longitudinally and laterally.

2. The apparatus of claim 1 wherein said fastening means includes three snap-fasteners.

3. The apparatus of claim 1 wherein said fastening means includes three screw-fasteners.

* * * * *